US008605068B2

(12) United States Patent
Lee et al.

(10) Patent No.: US 8,605,068 B2
(45) Date of Patent: Dec. 10, 2013

(54) LIGHT EMITTING DEVICE AND METHOD OF CONTROLLING THE SAME USING A DIFFERENTIAL AMPLIFIER

(75) Inventors: Sang-hoon Lee, Ulsan (KR); Jeong-il Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 812 days.

(21) Appl. No.: 11/634,842

(22) Filed: Dec. 7, 2006

(65) Prior Publication Data

US 2007/0279371 A1 Dec. 6, 2007

(30) Foreign Application Priority Data

Jun. 2, 2006 (KR) ........................ 10-2006-0049678

(51) Int. Cl.

| | |
|---|---|
| ***G06F 3/038*** | (2013.01) |
| ***G09G 5/10*** | (2006.01) |
| ***G09G 3/30*** | (2006.01) |
| ***G09G 3/36*** | (2006.01) |
| ***H01J 1/62*** | (2006.01) |

(52) U.S. Cl.
USPC ............. 345/211; 345/212; 345/690; 345/77; 345/102; 313/498

(58) Field of Classification Search
USPC ............ 345/76–104, 204–215, 690; 315/291; 348/801, 556, 607; 428/690; 340/643; 313/498–512
See application file for complete search history.

(56) References Cited

U.S. PATENT DOCUMENTS

| | | | | |
|---|---|---|---|---|
| 5,784,017 | A * | 7/1998 | Craven | 341/126 |
| 7,031,173 | B2 * | 4/2006 | Feldtkeller | 363/89 |
| 7,262,752 | B2 * | 8/2007 | Weindorf | 345/82 |
| 7,460,103 | B2 * | 12/2008 | Konno et al. | 345/102 |
| 7,505,018 | B2 * | 3/2009 | Feng et al. | 345/89 |
| 7,505,026 | B2 * | 3/2009 | Baba et al. | 345/102 |
| 7,511,695 | B2 * | 3/2009 | Furukawa et al. | 345/102 |
| 7,579,786 | B2 * | 8/2009 | Soos | 315/291 |
| 2001/0043050 | A1 * | 11/2001 | Fisher, Jr. | 320/101 |
| 2003/0103364 | A1 * | 6/2003 | Alfrey | 363/98 |
| 2003/0141807 | A1 * | 7/2003 | Kawase | 313/498 |
| 2003/0214242 | A1 * | 11/2003 | Berg-johansen | 315/169.3 |
| 2004/0135522 | A1 * | 7/2004 | Berman et al. | 315/291 |
| 2004/0135524 | A1 * | 7/2004 | Gunter et al. | 315/291 |
| 2004/0155608 | A1 * | 8/2004 | Trinschek et al. | 315/291 |
| 2004/0239243 | A1 * | 12/2004 | Roberts et al. | 313/512 |
| 2004/0251854 | A1 * | 12/2004 | Matsuda et al. | 315/291 |
| 2004/0252097 | A1 * | 12/2004 | Kaneki et al. | 345/102 |

(Continued)

FOREIGN PATENT DOCUMENTS

| | | |
|---|---|---|
| DE | 10013216 A1 | 9/2001 |
| EP | 1 564 821 | 8/2005 |

*Primary Examiner* — Bipin Shalwala
*Assistant Examiner* — Keith Crawley
(74) *Attorney, Agent, or Firm* — Roylance, Abrams, Berdo and Goodman, LLP

(57) ABSTRACT

Provided is a light emitting device and a method of controlling the same are disclosed. The light emitting unit includes a power supply unit for supplying a drive voltage to the light emitting unit, and a control unit for comparing a first current level previously applied to the light emitting unit with a second current level to be applied to the light emitting unit in accordance with image information to be displayed using the light emitting unit, and controlling a voltage level applied to the light emitting unit based on a result of comparison.

14 Claims, 5 Drawing Sheets

(56) References Cited

U.S. PATENT DOCUMENTS

| | | | | |
|---|---|---|---|---|
| 2005/0007085 | A1* | 1/2005 | Murakami | 323/282 |
| 2005/0116922 | A1* | 6/2005 | Kim | 345/102 |
| 2005/0140639 | A1* | 6/2005 | Oh et al. | 345/102 |
| 2005/0184952 | A1* | 8/2005 | Konno et al. | 345/102 |
| 2005/0185428 | A1 | 8/2005 | Crawford et al. | |
| 2005/0218791 | A1* | 10/2005 | Kawase | 313/500 |
| 2006/0028150 | A1* | 2/2006 | Vitunic et al. | 315/248 |
| 2006/0043911 | A1* | 3/2006 | Shao et al. | 315/291 |
| 2006/0109205 | A1* | 5/2006 | Deng | 345/46 |
| 2006/0187181 | A1* | 8/2006 | Kim | 345/102 |
| 2007/0139449 | A1* | 6/2007 | Bergquist et al. | 345/691 |
| 2007/0159421 | A1* | 7/2007 | Peker et al. | 345/82 |
| 2007/0195025 | A1* | 8/2007 | Korcharz et al. | 345/82 |
| 2008/0174544 | A1* | 7/2008 | Ueda et al. | 345/102 |
| 2009/0153464 | A1* | 6/2009 | Furukawa et al. | 345/102 |
| 2009/0189842 | A1* | 7/2009 | Huang et al. | 345/102 |
| 2010/0220049 | A1* | 9/2010 | Murakami | 345/102 |

* cited by examiner

LIGHT EMITTING DEVICE AND METHOD OF CONTROLLING THE SAME USING A DIFFERENTIAL AMPLIFIER

CROSS-REFERENCE TO RELATED APPLICATION

This application claims the benefit under 35 U.S.C. §119 (a) of Korean Patent Application No. 10-2006-049678, filed Jun. 2, 2006, in the Korean Intellectual Property Office, the entire disclosure of which is hereby incorporated by reference.

BACKGROUND OF THE INVENTION

1. Field of the Invention

The present invention relates to a light emitting device and a method of controlling the same. More particularly, the present invention relates to a light emitting device and a method of controlling the same, which can optimize a drive voltage to prevent a stress to peripheral devices, without distorting an optical output of a light emitting unit, and thus improve the efficiency of a system.

2. Description of the Related Art

Conventional display devices include direct view cathode ray tubes (CRT), a flat panel displays (FPD) and front and rear projectors. Exemplary FPDs include a liquid crystal display (LCD) panel and a plasma display panel (PDP). New display technologies, such as an organic electroluminescent (EL), liquid crystal on silicon (LCOS)and a digital light processing (DLP), are continuing to be developed for use in one or more types of display devices.

A display device using LCD, LCOS or a DLP technologies employs a light emitting device, such as a light emitting diode (LED), as a light source. An LED is a point light source, and has a high luminance and good color reproducibility. An LED driven by an electric current minimizes a ripple component of an output electric current so as to improve the quality of the displayed image. Further, an LED driven by an electric current requires a drive unit having a quick response characteristic in view of the characteristics of the display device. To achieve this, a linear current source may be used.

FIG. 1 is a circuit diagram illustrating a conventional LED driving device.

A conventional LED driving device 10 includes a variable voltage source 12, a control logic unit 14, a low-pass filter 16, a transistor 18, a current control unit 20, and a light emitting unit 22.

The variable voltage source 12 generates an optimum voltage so as to improve the efficiency of the LED driving device 10 when the light emitting unit 22 is driven. The control logic unit 14 monitors the voltage of $V_d$ (i.e., $V_o$-$V_{AK}$) so as to control the output of the variable voltage source 12, and generates a PWM signal so as to generate a reference voltage to be applied to the light emitting unit 22 using the monitored voltage. The low-pass filter 16 performs smoothing of the PWM signal generated by the control logic unit 14. The transistor 18 is connected in series with the light emitting unit 22, and generates the constant current required in the LED driving device 10 using the voltage provided from the variable voltage source 12. The current control unit 20 adjusts the amount of the current generated by the transistor 18. The light emitting unit 22 includes at least one LED which receives the constant current from the transistor 18 to emit light.

FIG. 2 is a graph depicting a variable output voltage outputted from the variable voltage source and a waveform of an electric current applied to the light emitting unit, according to the conventional LED driving device.

The LED driving device 10 must generate the optimum voltage so that the light emitting unit 22 emits light. In the LED driving device 10, the control logic unit 14 generates the PWM signal so as to output a constant voltage during an early driving stage. The control logic unit 14 controls the optimum value of the output voltage in such a manner that it waits until a time point $t_1$ at which time the variable voltage source 12 has generated a stable initial voltage, and it progressively decreases the pulse width of the PWM signal after the time point $t_1$ to reduce the output voltage.

The time point where the light emitting unit 22 emits light is a point after the time point $t_1$ where the initial voltage is set. From this time point on the control logic unit 14 generates a current command value, so that the current control unit 20 operates. As such, the LED driving device monitors the voltage $V_d$ applied to the transistor at regular intervals during the emission time of the light emitting unit 22, and reduces the pulse width of the PWM signal if the voltage $V_d$ is higher than a predetermined threshold value $V_{th}$, while the LED driving device increases the pulse width of the PWM signal if the voltage $V_d$ is lower than the predetermined threshold value $V_{th}$, thereby minimizing a thermal loss of the transistor 18 and adjusting the voltage so that the voltage does not affect the light emitting unit 22.

The display device using the above LED light source varies the command value of the output current depending upon brightness information of the image signal to be displayed. Under this condition, it is necessary to vary the voltage, which is applied to the light emitting unit 22 in accordance with the variation of the output current, depending upon the brightness change of the image signal, so that the optical output is not distorted. That is, the output voltage must be quickly varied from a low value to a high value when a dark image is switched over to a bright image. In this case, if the switching speed is low, the light emitting unit 22 may not produce a sufficient amount of luminance. By contrast, the output voltage must be varied from a high value to a low value when a bright image is switched over to a dark image. In this case, if the switching speed is low, the corresponding high voltage is applied to the peripheral devices, and this causes the occurrence of a thermal loss. Consequently, the efficiency of the display device is reduced, and thus a heat radiating structure must be designed correspondingly.

Accordingly, there is a need for an improved a light emitting device and a method of controlling the same, which can optimize a drive voltage to prevent a stress to peripheral devices and thus improve an efficiency of a system, without distorting an optical output of a light emitting unit.

SUMMARY OF THE INVENTION

Exemplary embodiments of the present invention address at least the above problems and/or disadvantages and provide at least the advantages described below. Accordingly, an aspect of the present invention is to provide a light emitting device and a method of controlling the same, which can optimize a drive voltage to prevent a stress to peripheral devices and thus improve an efficiency of a system, without distorting an optical output of a light emitting unit.

The foregoing and other objects and advantages are substantially realized by providing a light emitting device including a light emitting unit for emitting light, according to exemplary embodiments of the present invention, which includes a power supply unit for supplying a drive voltage to the light emitting unit, and a control unit comparing a first current level previously applied to the light emitting unit with a second current level to be applied to the light emitting unit in accordance with image information to be displayed using the light emitting unit, and controlling a voltage level applied to the light emitting unit based on a result of comparison.

The control unit may control the power supply unit such that if the second current level is higher than the first current level and a difference between the first current level and the second current level is higher than a current threshold value, the control unit applies the drive voltage to the light emitting unit by increasing the voltage level corresponding to the first current level by a specified offset voltage, while if the second current level is lower than the first current level and the difference between the first current level and the second current level is higher than the current threshold value, the control unit applies the drive voltage to the light emitting unit by reducing the voltage level corresponding to the first current level by a specified offset voltage.

The control unit may further control the power supply unit such that if a difference between the first current level and the second current level is less than the threshold current value and the drive voltage is greater than a threshold voltage level, the control unit applies the drive voltage to the light emitting unit by decreasing the voltage level by a corrected value, wherein if a difference between the first current level and the second current level is less than the threshold current value and the drive voltage is less than a threshold voltage level, the control unit applies the drive voltage to the light emitting unit by increasing the voltage level by a corrected value. The light emitting device may further comprise a memory comprising a lookup table for storing corrected values for the voltage level applied to the light emitting unit corresponding to the result of comparing the first and second current levels, and the control unit may adjust the voltage level of the drive voltage to be output from the power supply unit with reference to the lookup table.

The control unit may further control the power supply unit such that if the second current level is higher than the first current level, the control unit applies the drive voltage to the light emitting unit by increasing the voltage level corresponding to the first current level by a specified level, while if the second current level is lower than the first current level, the control unit applies the drive voltage to the light emitting unit by reducing the voltage level corresponding to the first current level by a specified level.

The control unit may further control the power supply unit such that if the second current level is higher than a minimum current level the control unit compares the first current level with the second current level, while if the second current level is lower than the minimum current level the control unit applies the drive voltage to the light emitting unit corresponding to the first current level.

In another aspect of an exemplary embodiment of the present invention, there is provided a method of controlling a light emitting device including a light emitting unit for emitting light, which includes supplying a drive voltage to the light emitting unit, and comparing a first current level previously applied to the light emitting unit with a second current level to be applied to the light emitting unit in accordance with image information to be displayed using the light emitting unit, and controlling a voltage level to be applied to the light emitting unit based on a result of comparison.

The control step may control the light emitting device such that if the second current level is higher than the first current level and a difference between the first current level and the second current level is higher than a threshold current value, the drive voltage is applied to the light emitting unit by increasing the voltage level corresponding to the first current level by a specified offset voltage, while if the second current level is lower than the first current level and the difference between the first current level and the second current level is higher than the threshold current value, the drive voltage is applied to the light emitting unit by reducing the voltage level corresponding to the first current level by a specified offset voltage.

The control step may control the light emitting device such that if a difference between the first current level and the second current level is less than the threshold current value and the drive voltage is greater than a threshold voltage level, the drive voltage is applied to the light emitting unit by decreasing the voltage level by a corrected value, wherein if a difference between the first current level and the second current level is less than the threshold current value and the drive voltage is less than a threshold voltage level, the drive voltage is applied to the light emitting unit by increasing the voltage level by a corrected value.

The control step may control the light emitting device such that the drive voltage level to be applied to the light emitting unit is adjusted with reference to a lookup table, wherein the lookup table stores corrected values for the drive voltage level to be applied to the light emitting unit corresponding to the result of comparing the first and second current levels. The control step may control the light emitting device such that if the second current level is higher than the first current level, the drive voltage applied to the light emitting unit by increasing the voltage level corresponding to the first current level by a specified level, while if the second current level is lower than the first current level, the drive voltage is applied to the light emitting unit by reducing the voltage level corresponding to the first current level by a specified level.

The control step may control the light emitting device such that if the second current level is higher than a minimum current level the first current level and the second current level are compared, while if the second current level is lower than the minimum current level the drive voltage is applied to the light emitting unit corresponding to the first current level.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
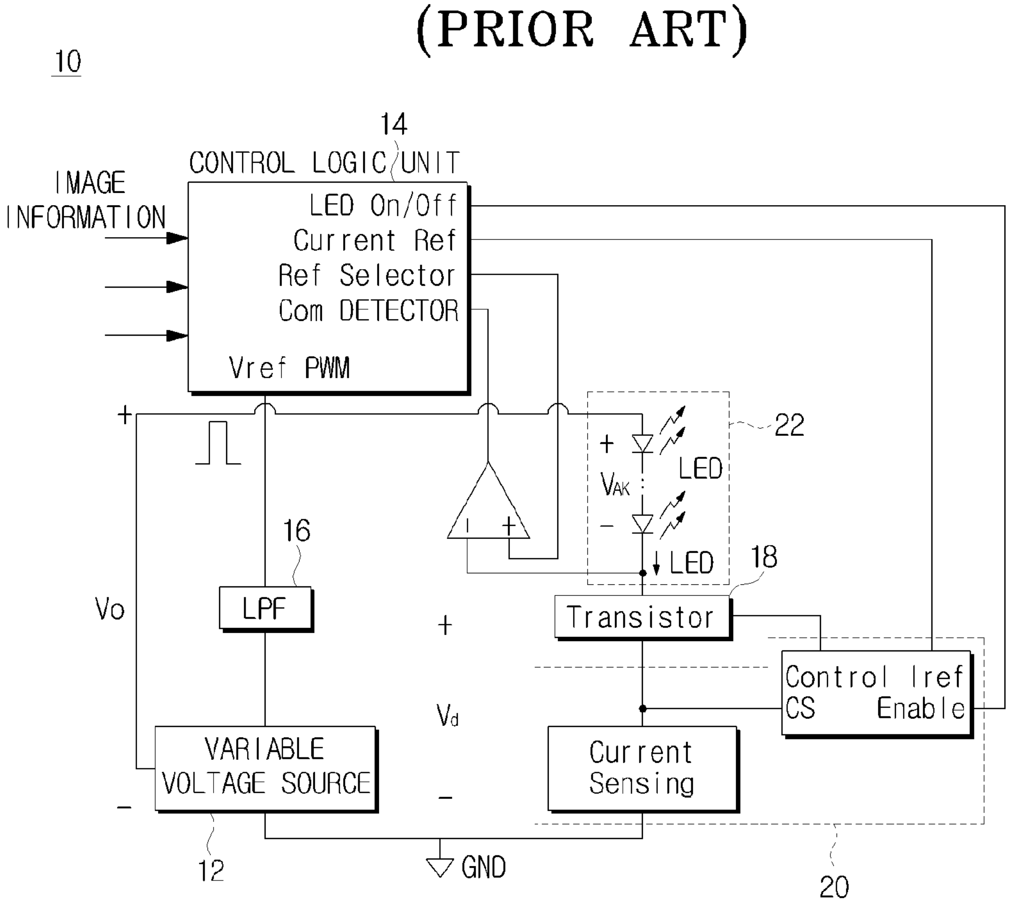
FIG. 1 (PRIOR ART)
FIG. 1 is a circuit diagram illustrating a conventional light emitting device.
Figure 2:
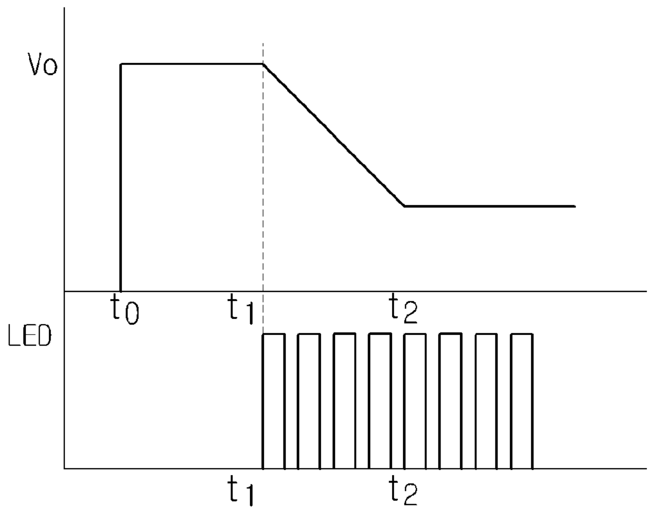
FIG. 2 (PRIOR ART)
FIG. 2 is a graph depicting a variable output voltage outputted from a variable voltage source and a waveform of an electric current applied to a light emitting unit, according to a conventional light emitting device.
Figure 3:
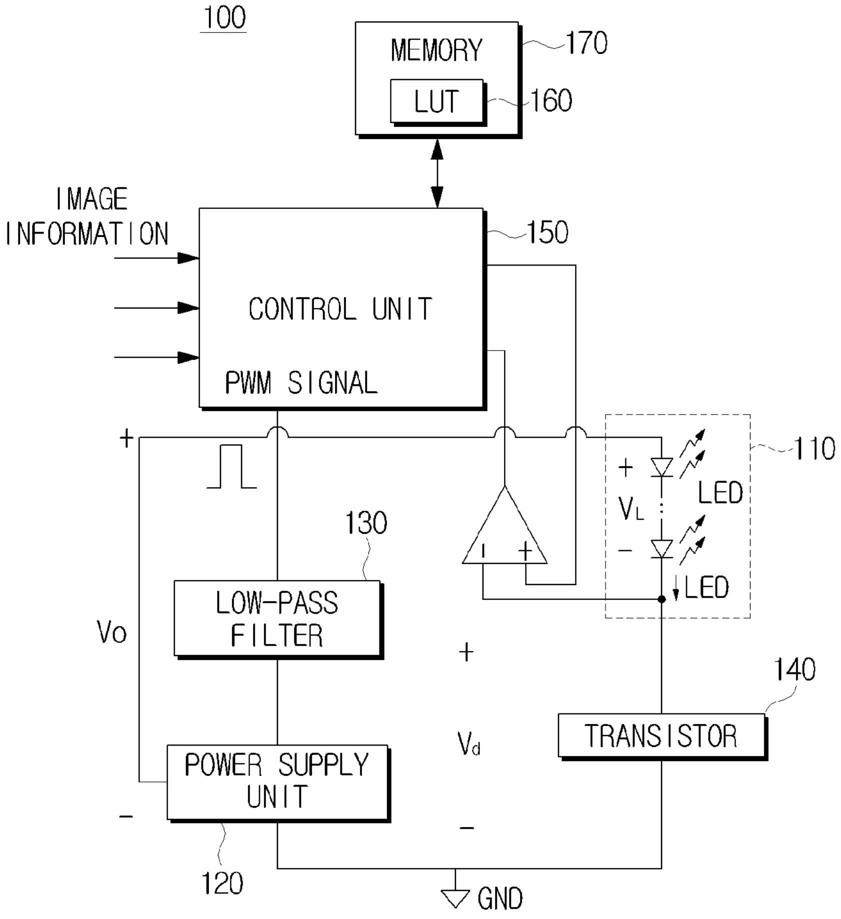
FIG. 3 is a circuit diagram illustrating the construction of a light emitting device according to an exemplary embodiment of the present invention.

FIG. 3 is a circuit diagram illustrating the construction of a light emitting device according to an exemplary embodiment of the present invention.

A light emitting device 100 according to this exemplary embodiment includes a light emitting unit 110, a power supply unit 120, a low-pass filter 130, a transistor 140, a control unit 150, and a memory 170.

The light emitting unit 110 emits light to a screen (not shown) for displaying an image. The light emitting unit 110 of this exemplary embodiment may have a plurality of light emitting diodes (LED) as a light source. Further, the light emitting unit 110 may have light emitting diodes of various colors such as red (R), green (G), and blue (B), or a laser diode.

The power supply unit 120 is a power source for supplying a constant electric voltage to the light emitting unit 110. The power supply unit 120 outputs a variable voltage to the light emitting unit 110 so as to maintain a voltage $V_d$, which is applied to the transistor 140 by the control unit 150, at a constant level. Preferably, the power supply unit 120 is capable of varying the voltage from a level higher than a maximum voltage which can be applied to the light emitting unit 110 to a level lower than a minimum voltage which can be applied to the light emitting unit 110.

The low-pass filter 130 filters a pulse width modulation (PWM) signal received from the control unit 150 to generate an analog reference voltage.

Although the low-pass filter 130 is used in this exemplary embodiment, a digital to analog converter (DAC) for converting a digital signal into an analog signal may be used depending upon the application. Alternatively, an analog to digital converter (ADC) for converting a signal to be input to the control unit 150 into a digital signal may be used, if necessary.

The transistor 140 is connected in series with the light emitting unit 110, and generates a constant current required for the light emitting device 100 using the voltage provided from the power supply unit 120.

The transistor 140 may include a switching element (not shown) such as a field effect transistor (FET) or a bipolar junction transistor (BJT). The transistor 140 adjusts a signal applied to a gate electrode of the FET or a base terminal of the BJT, thereby controlling a current flowing through a collector-emitter or drain-source. Therefore, if a circuit having the FET and the BJT is used, a current can be precisely supplied to the light emitting unit 110 of the light emitting device 100 in a rapid switching speed, without generating a noise. For example, since the current flowing in the drain-source of the FET in a saturated region is maintained at a constant value, irrespective of the voltage applied to the drain-source, the constant current to be applied to the light emitting unit 110 can be generated using the above property.

The control unit 150 may generate a reference voltage to be input to the power supply unit 120 so as to control the output voltage of the power supply unit 120. The control unit 150 may include a control logic unit. For example, the control unit 150 can generate the PWM signal using a digital logic unit such as a microcomputer or a filed programmable gate array (FPGA).

Further, the control unit 150 of this exemplary embodiment obtains a value of an amount of current (hereinafter referred to as a "present current level") for the voltage to be applied to the light emitting unit 110 based on image information to be input, and compares the present current level with a current level previously applied to the light emitting unit 110 (hereinafter referred to as a "previous current level"). The previous current level may be obtained from previous image information that was input to the light emitting device 100 prior to the present image information being input.

The control unit 150 adjusts a level of the voltage supplied to the light emitting unit 110 from the power supply unit 120 according to the compared result. If the previous current level is higher than the present current level, the voltage level of the driving voltage to be output from the power supply unit 110 is reduced by a select level. If the previous current level is lower than the present current level, the voltage level to be output from the power supply unit 110 is increased by a select level. The control unit 150 compares the previous current level with the present current level, and adjusts the drive voltage to be applied to the light emitting unit 110 with respect to the difference between the current levels, thereby quickly optimizing the output of the drive voltage without distorting the optical output of the light emitting unit 110.

The control unit 150 according to this exemplary embodiment continuously adjusts the level of the drive voltage supplied from the power supply unit 120 at the time of normal drive, as well as the time of initial drive. The normal time of the light emitting unit 110 means the point when a predetermined time elapses after the initial drive. That is, the normal time of the light emitting unit 110 means the period from the time when the current and voltage applied to the light emitting unit 110 are stabilized to the time when the operation of the light emitting unit 110 is completed.

Further, the control unit 150 can adjust the level of the drive voltage supplied to the light emitting unit 110 from the power supply unit 120 with reference to a lookup table 160 that is stored in the memory 170.

The control unit 150 outputs the PWM signal to the power supply unit 120, and the level of the drive voltage to be output from the power supply unit 120 is varied depending upon the pulse width of the PWM signal.

The lookup table 160 stores corrected values for the voltage levels applied to the light emitting unit 110 corresponding to the compared results of the previous current level and the present current level. Table 1 is one example of the lookup table.

TABLE 1

| Absolute Value of (Present Current Level − Previous Current Level) | Corrected Value |
|---|---|
| 1~5 | 2 |
| 6~10 | 4 |
| 11~15 | 6 |
| 16~20 | 8 |

The control unit 150 can adjust the voltage level of the drive voltage to be applied to the light emitting unit 110 based on the lookup table 160. For example, if the previous current level is 3 higher than the present current level. The control unit 150 adjusts the drive voltage of the power supply unit 120 by reducing the pulse width of the PWM signal, with reference to the lookup table 160, to decrease the drive voltage to be applied to the light emitting unit 110 by the corrected value 2. Similarly, when the control unit 150 of the light emitting device 100 adjusts the drive voltage to be applied to the light emitting unit 110 with reference to the lookup table 160, the control unit 150 can adjust the drive voltage to be applied to the light emitting unit 110 more quickly.

The control unit 150 according to an exemplary embodiment of the present invention can store the information on the maximum value and minimum value of the voltage level of the drive voltage. As such, while the control unit 150 adjusts the voltage level of the drive voltage according to the above method, the control unit 150 determines that the light emitting unit 110 operates incorrectly if the voltage level of the drive voltage deviates from the maximum value or minimum value or if it is necessary to adjust the voltage level of the drive voltage even though it reaches the maximum value or minimum value.

Specifically, the control unit 150 according an exemplary embodiment of the present invention determines that the light emitting unit 120 is in an open state, if the voltage $V_d$ applied to the transistor 140 remains lower than the threshold value $V_{th}$ despite the drive voltage having reached the maximum value. Further, the control unit 150 determines that the light emitting unit 120 is in a short state, if the voltage $V_d$ applied to the transistor 140 is higher than the threshold value $V_{th}$ despite the drive voltage having reached the minimum value. In this case, a specified range may be a difference between the maximum value and the minimum value of the current level to the voltage level of the drive voltage.

Figure 4:
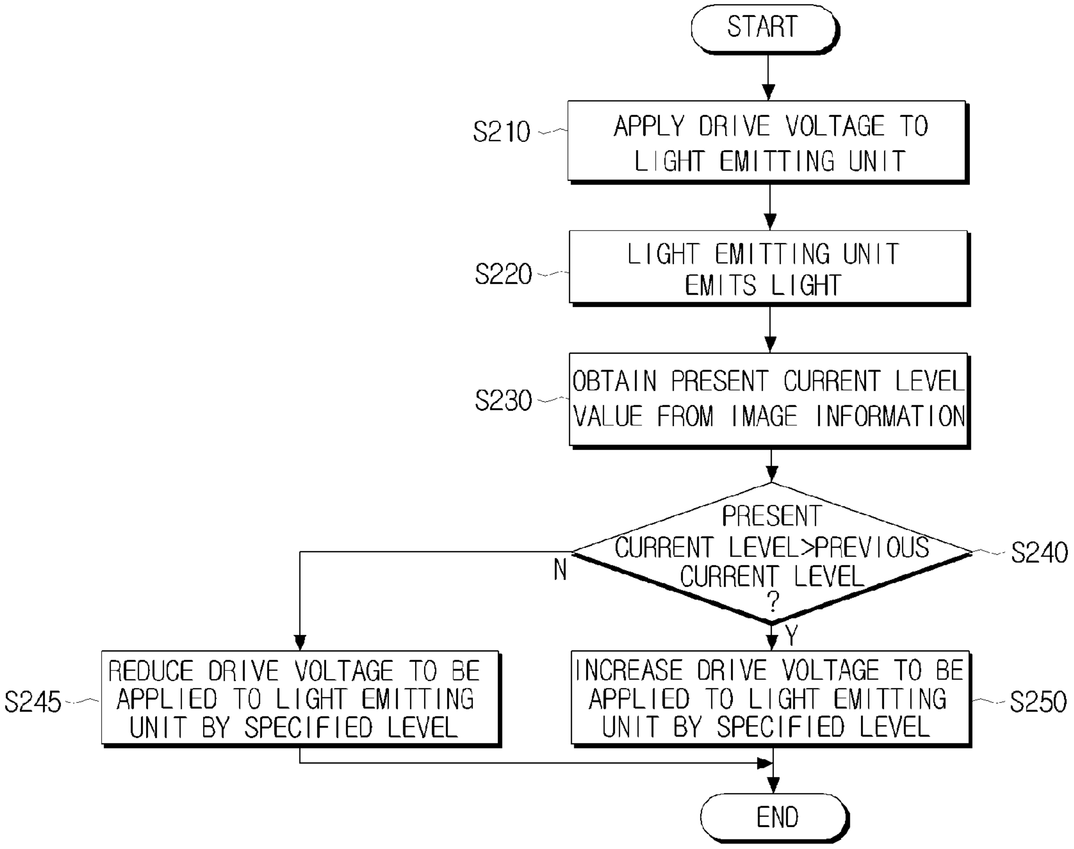
FIG. 4 is a flowchart illustrating a process of controlling a light emitting device according an exemplary embodiment of the present invention.

FIG. 4 is a flowchart illustrating a process of controlling the light emitting device according an exemplary embodiment of the present invention.

The control unit 150 controls the power supply unit 120 to apply the drive voltage to the light emitting unit 110 (S210), so that light emitting unit 120 emits light (S220). The control unit 150 analyzes the image information continuously received, and obtains the value of the present current level for the drive voltage to be applied to the light emitting unit 110 (S230).

The control unit 150 determines whether the present current level obtained in step S230 is higher than the previous current level for the drive voltage applied to the light emitting unit 110 (S240). As a result, if the present current level is higher than the previous current level previously applied ("Yes" in S240), the control unit 150 increases the drive voltage to be applied to the light emitting unit 110 from the power supply unit 120 by a specified level.

However, if the present current level is lower than the previous current level previously applied ("No" in S240), the control unit 150 reduces the drive voltage to be applied to the light emitting unit 110 from the power supply unit 120 by a specified level (S245).

Figure 5:
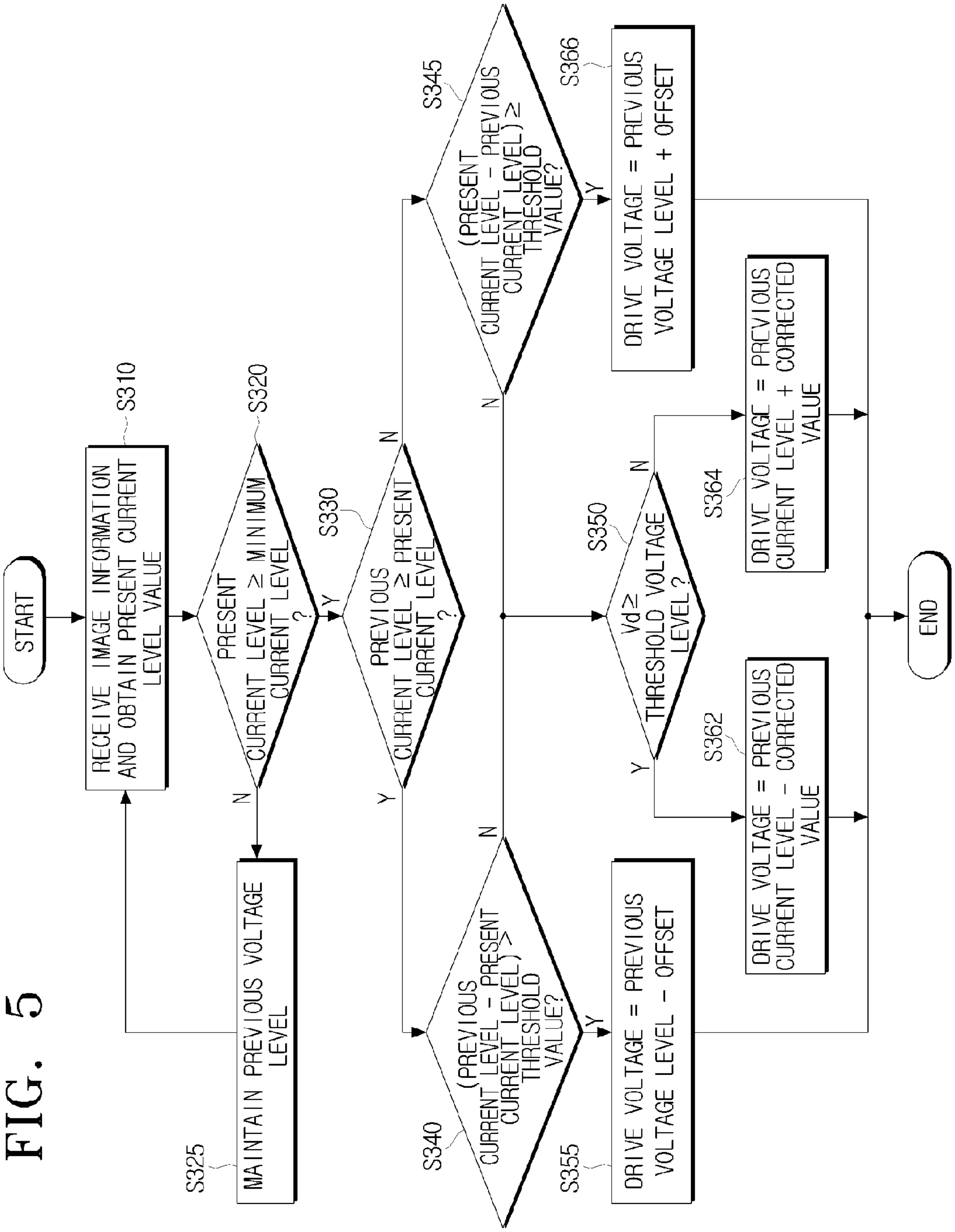
FIG. 5 is a flowchart illustrating a process of controlling a light emitting device according another exemplary embodiment of the present invention.

FIG. 5 is a flowchart illustrating a process of controlling the light emitting device according another exemplary embodiment of the present invention.

The control unit 150 obtains the value of the present current level for the drive voltage to be applied to the light emitting unit 110 based on the input image information (S310).

The control unit 150 determines whether the obtained present current level is higher or equal to a minimum current level (S320). If the present current level is higher than or equal to the minimum current level ("Yes" in S320), the control unit 150 determines whether the previous current level is higher than or equal to the present current level (S330). But, if the present current level is not higher than or equal to the minimum current level ("No" in S320), the control unit 150 maintains the previous voltage level to be applied to the light emitting unit 110 (S325).

If the previous current level is higher than or equal to the present current level ("Yes" in S330), the control unit 150 determines whether the difference between the previous current level and the present current level is higher than or equal to the threshold value (S340). If it is determined that the difference between the previous current level and the present current level is higher than or equal to the threshold value, it can determine whether the value of the drive voltage to be applied to the light emitting unit 110 is abruptly varied. In this embodiment, if the difference between the previous current level and the present current level is higher than or equal to the threshold value, the value of the drive voltage to be applied to the light emitting unit 110 is abruptly varied. However, if the difference is not higher than or equal to the threshold value, then the value of the drive voltage to be applied to the light emitting unit 110 is not abruptly varied.

If the difference between the previous current level and the present current level is not higher than or equal to the threshold level ("No" in S340), the control unit 150 determines whether the voltage level of the voltage $V_d$ to be applied to the transistor 140 is higher than or equal to a threshold voltage level (S350). If the difference between the previous current level and the present current level is higher than or equal to the threshold level ("Yes" in S340), the control unit 150 controls the power supply unit 120 by applying a drive voltage, which is determined by subtracting an offset value of the PWM signal from the previous voltage level, to the light emitting unit 110 (S355).

If the previous current level is not higher than or equal to the present current level ("No" in S330), the control unit 150 determines whether the difference between the previous current level and the present current level is higher than or equal to the threshold value (S345). If it is determined that the difference between the previous current level and the present current level is not higher than or equal to the threshold value ("No" in S345), the control unit 150 determines whether the voltage level of the voltage $V_d$ to be applied to the transistor 140 is higher than or equal to a threshold voltage level (S350).

If the voltage level of the voltage $V_d$ to be applied to the transistor 140 is higher than or equal to the threshold voltage level ("Yes" in S350), the control unit 150 applies a voltage level, which is determined by subtracting a corrected value from the previous voltage level with reference to the lookup table 160, to the light emitting unit 110 (S362). If the voltage level of the voltage $V_d$ to be applied to the transistor 140 is not higher than or equal to the threshold voltage level ("No" in S350), the control unit 150 applies a voltage level, which is determined by adding a corrected value to the previous voltage level with reference to the lookup table 160, to the light emitting unit 110 (S364).

If the difference between the previous current level and the present current level is higher than or equal to the threshold level ("Yes" in S345), the control unit 150 controls the power supply unit 120 by applying a drive voltage, which is determined by adding an offset value of the PWM signal to the previous voltage level, to the light emitting unit 110 (S366).

As described above, according to exemplary embodiments of the present invention, the light emitting device and the method of controlling the same can optimize the drive voltage without distorting the optical output of the light emitting unit, and thus improve the efficiency of the system.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A light emitting device including a light emitting unit for emitting light, comprising:

a control unit for analyzing an image information continuously received, obtaining a first current level corresponding to a current for displaying a first image and a second current level corresponding to a current for displaying a subsequent second image, and extracting a differential value by comparing the first current level with the second current level, the control unit obtaining the first current level by analyzing pixel value information of the first image displayed on a display device;

a differential amplifier, having a first input from the control unit of the first current level corresponding to a current for displaying the first image, and a second input of the second current level corresponding to a current for displaying the subsequent second image, for extracting the differential value;

a power supply unit for supplying a level-adjusted analogue voltage to the light emitting unit by adjusting a voltage level of a drive voltage according to the differential value; and a memory for storing corrected values for the voltage level to be applied to the light emitting unit corresponding to the result of comparing the first and second current levels, wherein the first current level and the second current level are obtained separately, wherein the control unit adjusts a pulse width of a pulse width modulation (PWM) signal by using the corrected values, and wherein the power supply unit adjusts the voltage level by using the adjusted PWM signal as the differential value.

2. The light emitting device of claim 1, wherein the control unit controls the power supply unit such that if the second current level is higher than the first current level and a difference between the first current level and the second current level is higher than a threshold current value, the control unit applies the drive voltage to the light emitting unit by increasing a voltage level corresponding to the first current level by a specified offset voltage, while if the second current level is lower than the first current level and the difference between the first current level and the second current level is higher than the threshold current value, the control unit applies the drive voltage to the light emitting unit by reducing the voltage level corresponding to the first current level by a specified offset voltage.

3. The light emitting device of claim 2, wherein the control unit controls the power supply unit such that if the difference between the first current level and the second current level is less than the threshold current value and the drive voltage is greater than a threshold voltage level, the control unit applies the drive voltage to the light emitting unit by decreasing the voltage level by a corrected value, wherein if a difference between the first current level and the second current level is less than the threshold current value and the drive voltage is less than a threshold voltage level, the control unit applies the drive voltage to the light emitting unit by increasing the voltage level by a corrected value.

4. The light emitting device of claim 1, wherein the memory comprises a lookup table for storing corrected values for the voltage level to be applied to the light emitting unit corresponding to the differential value if the differential value does not exceed the predetermined threshold.

5. The light emitting device of claim 1, wherein the control unit controls the power supply unit such that if the second current level is higher than the first current level, the control unit applies the drive voltage to the light emitting unit by increasing the voltage level corresponding to the first current level by a specified level, while if the second current level is lower than the first current level, the control unit applies the drive voltage to the light emitting unit by reducing the voltage level corresponding to the first current level by a specified level.

6. The light emitting device of claim 1, wherein the control unit controls the power supply unit such that if the second current level is higher than a minimum current level the control unit compares the first current level with the second current level, while if the second current level is lower than the minimum current level the control unit applies the drive voltage to the light emitting unit corresponding to the first current level.

7. A method of controlling a light emitting device including a light emitting unit for emitting light, comprising:

analyzing an image information continuously received;

obtaining a first current level corresponding to a current for displaying a first image and a second current level corresponding to a current for displaying a subsequent second image, wherein the first current level and the second current level are obtained separately, the first current level obtained by analyzing pixel value information of the first image displayed on a display device;

extracting a differential value by providing a first differential amplifier input from a control unit of the first current level corresponding to a current for displaying the first image, providing a second differential amplifier input of the second current level corresponding to a current for displaying the subsequent second image, and comparing the first current level with the second current level;

storing corrected values for a voltage level to be applied to the light emitting unit corresponding to the result of comparing the first and second current levels; and supplying a level-adjusted analogue voltage to the light emitting unit by adjusting a voltage level of a drive voltage according to the differential value, wherein supplying the level-adjusted analogue voltage comprises:

adjusting a pulse width of a pulse width modulation (PWM) signal by using the corrected values, and adjusting the voltage level by using the adjusted PWM signal as the differential value.

8. The method of claim 7, wherein if the second current level is higher than the first current level and a difference between the first current level and the second current level is higher than a threshold current value, the drive voltage is applied to the light emitting unit by increasing a voltage level corresponding to the first current level by a specified offset voltage, while if the second current level is lower than the first current level and the difference between the first current level and the second current level is higher than the threshold current value, the drive voltage is applied to the light emitting unit by reducing the voltage level corresponding to the first current level by a specified offset voltage.

9. The method of claim 8, wherein if the difference between the first current level and the second current level is less than the threshold current value and the drive voltage is greater than a threshold voltage level, the drive voltage is applied to the light emitting unit by decreasing the voltage level by a corrected value, wherein if a difference between the first current level and the second current level is less than the threshold current value and the drive voltage is less than a threshold voltage level, the drive voltage is applied to the light emitting unit by increasing the voltage level by a corrected value.

10. The method of claim 7, wherein the drive voltage level to be applied to the light emitting unit is adjusted with reference to a lookup table, wherein the lookup table stores the corrected values for the drive voltage level to be applied to the light emitting unit corresponding to the differential value if the differential value does not exceed the predetermined threshold.

11. The method of claim 7, wherein if the second current level is higher than the first current level, the drive voltage applied to the light emitting unit by increasing the voltage level corresponding to the first current level by a specified level, while if the second current level is lower than the first current level, the drive voltage is applied to the light emitting unit by reducing the voltage level corresponding to the first current level by a specified level.

12. The light emitting device of claim 7, wherein if the second current level is higher than a minimum current level the first current level and the second current level are compared, while if the second current level is lower than the minimum current level the drive voltage is applied to the light emitting unit corresponding to the first current level.

13. The light emitting device of claim 1, wherein the control unit compares a first current level previously applied to the light emitting unit with a second current level to be applied only if the second current level exceeds a minimum current level.

14. The method of claim 7, wherein comparing a first current level previously applied to the light emitting unit with a second current level to be applied to the light emitting unit occurs only if the second current level exceeds a minimum current level.

* * * * *